(12) United States Patent  
Graczyk et al.

(10) Patent No.: US 9,330,287 B2  
(45) Date of Patent: May 3, 2016

(54) REAL-TIME ASSET TRACKING AND EVENT ASSOCIATION

(71) Applicant: RF CODE, INC., Austin, TX (US)

(72) Inventors: Ronald B. Graczyk, Cedar Park, TX (US); Ryan D. Joy, Austin, TX (US); Michael R. Primm, Austin, TX (US); Jesse L. Richardson, Austin, TX (US); Dale E. Parvey, Austin, TX (US)

(73) Assignee: RF CODE, INC., Austin, TX (US)

( * ) Notice: Subject to any disclaimer, the term of this patent is extended or adjusted under 35 U.S.C. 154(b) by 131 days.

(21) Appl. No.: 13/784,126

(22) Filed: Mar. 4, 2013

(65) Prior Publication Data

US 2013/0229263 A1    Sep. 5, 2013

Related U.S. Application Data

(60) Provisional application No. 61/606,222, filed on Mar. 2, 2012.

(51) Int. Cl.

| | |
|---|---|
| *G08B 1/08* | (2006.01) |
| *G06K 7/10* | (2006.01) |
| *G06K 19/07* | (2006.01) |
| *G08B 25/08* | (2006.01) |
| *G08B 25/10* | (2006.01) |
| *G01S 1/70* | (2006.01) |
| *G01S 13/82* | (2006.01) |
| *G06Q 10/06* | (2012.01) |
| *G08C 23/04* | (2006.01) |
| *H04Q 9/00* | (2006.01) |

(52) U.S. Cl.

CPC ............... *G06K 7/10099* (2013.01); *G01S 1/70* (2013.01); *G01S 13/825* (2013.01); *G06K 7/10089* (2013.01); *G06K 19/0723* (2013.01); *G06Q 10/06* (2013.01); *G08B 25/08* (2013.01); *G08B 25/10* (2013.01); *G08C 23/04* (2013.01); *H04Q 9/00* (2013.01); *H04Q 2209/47* (2013.01)

(58) Field of Classification Search

CPC ... G08B 25/08; G01S 13/825; G06K 7/10099  
USPC .......... 340/572.1, 572.4, 573.2, 539.11, 506, 340/10.1, 10.2, 10.3, 10.34, 10.51; 342/429, 445; 235/375, 385

See application file for complete search history.

(56) References Cited

U.S. PATENT DOCUMENTS

| | | | | |
|---|---|---|---|---|
| 7,843,350 | B2 * | 11/2010 | Geissler et al. | ............ 340/573.2 |
| 8,149,125 | B2 * | 4/2012 | Geissler et al. | ............ 340/573.2 |
| 8,195,333 | B2 * | 6/2012 | Ziegler et al. | ................. 700/259 |
| 8,587,432 | B2 * | 11/2013 | Mulla | ........................ 340/572.1 |
| 8,680,970 | B2 * | 3/2014 | Sadr et al. | ..................... 340/10.1 |
| 8,766,780 | B2 * | 7/2014 | Graczyk et al. | ............. 340/10.5 |
| 8,786,440 | B2 * | 7/2014 | Clare et al. | ................. 340/572.1 |
| 2006/0132302 | A1 * | 6/2006 | Stilp | ........................ 340/539.22 |
| 2008/0029590 | A1 * | 2/2008 | Zosimadis et al. | ............ 235/375 |

* cited by examiner

*Primary Examiner* — Van Trieu

(57) ABSTRACT

A system including a detector, a reader, and a tag. The detector includes a sensor to detect a user event, and a communication circuitry to communicate at a first frequency band. The reader includes communication circuitry to communicate at a second frequency band. The tag includes a first communication circuitry to communicate at the first frequency band and a second communication circuitry to communicate at the second frequency band. The detector is to communicate with the tag via the communication circuitry of the detector. The detector is to determine whether to associate the tag with the user event. The detector is to communicate the determined association. The tag is to communicate using the second communication circuitry of the tag with the reader.

20 Claims, 7 Drawing Sheets

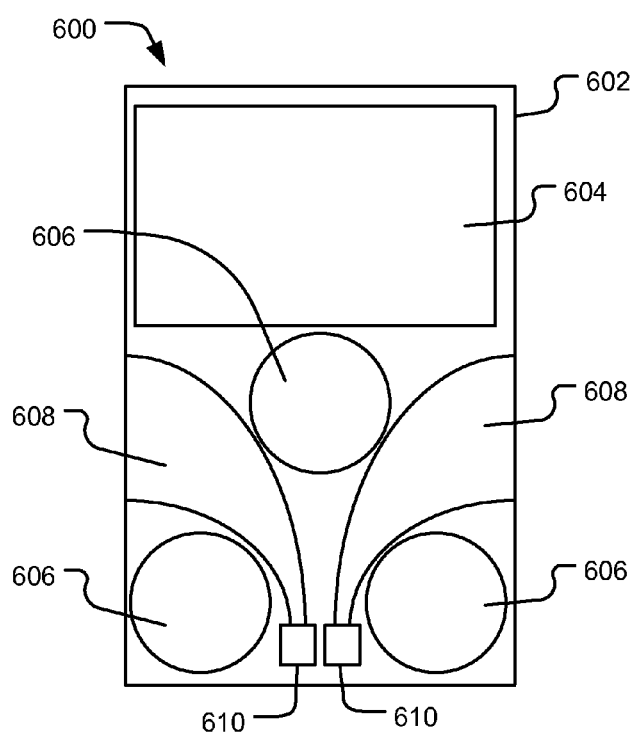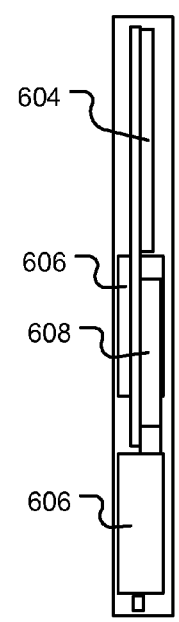
*FIG. 6*
*FIG. 7*

REAL-TIME ASSET TRACKING AND EVENT ASSOCIATION

CROSS-REFERENCE TO RELATED APPLICATION(S)

This application claims benefit of U.S. Provisional Application No. 61/606,222, filed Mar. 2, 2012, and entitled "REAL-TIME ASSET TRACKING AND EVENT ASSOCIATION," which is incorporated herein by reference in its entirety.

FIELD OF THE DISCLOSURE

This disclosure, in general, relates to real-time asset tracking and event association and, in particular, relates to associating asset tags with events.

BACKGROUND

Increasingly, industry is turning to automated methods of tracking assets, including personnel. Depending on the usage, such asset tracking provides for improved efficiencies and asset management, safety, productivity, or compliance with business policies. In addition, such asset tracking can reduce theft or unauthorized access. However, repetitively and accurately sensing, monitoring, recording, tracking, alerting, predicting, and reporting the activities of the assets is difficult.

Manual methods of validating the presence or absence of an asset and ingress or egress, even when enhanced by the addition of video surveillance, are costly and error-prone due to human factors. For example, manual observation of hospital employees following a hand hygiene regimen can be expensive and miss a large portion of the employees complete hygiene behavior. In another example, tracking patients in an emergency room using traditional methods is error-prone.

Passive radiofrequency identification (RFID) has a limited range. High electromagnetic field strengths can interfere with hospital equipment, and running wires for both power and data to a passive RFID reader is considered disadvantageous. Further, passive asset tags provide no information while outside a small perimeter in proximity to the passive RFID reader.

Infrared solutions of hybrid infrared (IR) solutions utilize line of sight and typically utilize directional alignment with the IR emitter. When IR intensity is used as a metric for proximity decisions, secondary reflections make it difficult to determine scalar information to discern among multiple assets in close proximity, all communicating simultaneously.

Wi-Fi solutions utilize data drops and power to the Wi-Fi readers. Wi-Fi asset tags have a relatively short battery life and utilize a large device, making deployment impractical. Wi-Fi locators also lack the positional accuracy and resolution for associating an asset with an event, such as washing hands or attending a bed.

As such, an improved asset or personnel tracking system would be desirable.

SUMMARY

In a first aspect, a system includes a detector including a sensor to detect an event and a communication circuitry to communicate at a first frequency band. The system further includes a reader comprising communication circuitry to communicate at a second frequency band. The system also includes a tag including a first communication circuitry to communicate at the first frequency band and a second communication circuitry to communicate at the second frequency band. The detector is to communicate with the tag via the communication circuitry of the detector. The detector is to determine whether to associate the tag with the event. The detector is to communicate the determined association. The tag is to communicate using the second communication circuitry of the tag with the reader.

In a second aspect, a detector includes a sensor to detect an event, a first communication circuitry to communicate at a first frequency band, the first communication circuitry being directional, a second communication circuitry to communicate at a second frequency band, and the detector to communication with a tag using the first communication circuitry in response to a user event detected via the sensor. The detector is to associate a select tag with the user event. The detector is to communicate the association using the first or second communication circuitry.

In a third aspect, a tag includes a processor, a first communication circuitry communicatively coupled to the processor and to communicate at a first frequency band, a second communication circuitry communicatively coupled to the processor and to communicate at a second frequency band, a notification circuitry communicatively coupled to the processor, and the processor to direct the first communication circuitry to communicate with a detector, the tag to receive a message indicating an association with an event. The processor is to direct the notification circuitry to notify a user in response to receiving the message.

In a fourth aspect, a dispenser includes a container, a user interface to facilitate dispensing from the container, and a detector. The detector includes a sensor to detect a user event via the user interface, a first communication circuitry to communicate at a first frequency band, the first communication circuitry being directional, and a second communication circuitry to communicate at a second frequency band. The detector is to communication with a tag using the first communication circuitry in response to the user event detected via the sensor. The detector is to associate a select tag with the user event. The detector is to communicate the association using the first or second communication circuitry.

In a fifth aspect, a method of determining an association between a tag and a user event includes detecting an event, transmitting a message to a tag via a short-range frequency band communication circuitry, receiving a response message from the tag via the short-range frequency band communication circuitry, determining an association between the tag and the user event based on a characteristic of the response message, and communicating the determined association.

In a sixth aspect, a method of determining an association between a tag and a user event includes receiving a tag signal at a detector in response to an initial signal from the detector, determining whether the tag is located in a first zone or second zone based on a signal strength associated with the tag signal, and selecting the tag for association with the user event when the tag is located in the first zone.

BRIEF DESCRIPTION OF THE DRAWINGS

The present disclosure may be better understood, and its numerous features and advantages made apparent to those skilled in the art by referencing the accompanying drawings.

FIG. 6 and FIG. 7 include illustrations of an exemplary asset tag.

The use of the same reference symbols in different drawings indicates similar or identical items.

DETAILED DESCRIPTION

In an exemplary embodiment, a system includes a detector that senses an event. The detector uses a short-range communication protocol to communicate with nearby identification tags. Based on the communication with the identification tags, the event is associated with a tag or an asset to which the tag is associated. For example, the detector can determine which tag to associate with an event based on signal strength, motion of the tag, dwell time, change in signal strength over time, maximum or minimum signal strength, or any combination thereof. The event can be a user action sensed by the detector, such as activating a switch, button, lever, touch pad, proximity sensor, or any combination thereof, or can be an autonomous event detected by a sensor, for example, a radiation release, a machine failure or a chemical leak. Once the tag is associated with the event, the association is communicated to a reader. The reader or other associated computational circuitry can store the association and perform various functions in response to the association. In an example, the detector or the tag can communicate the association to the reader using a communication protocol separate from the short-range communication protocol. In an example, the short-range communication protocol is directional.

In another example, a method for tracking an asset or tag includes sensing an event, such as a user action, communicating with identification tags, and associating a tag with the event based on the communication with the identification tags. An identification tag can be selected for association with the event based on zone-based logic or taking into account signal strength, dwell time, the changes in signal strength over time, a maximum or minimum signal strength, or any combination thereof.

Figure 1:
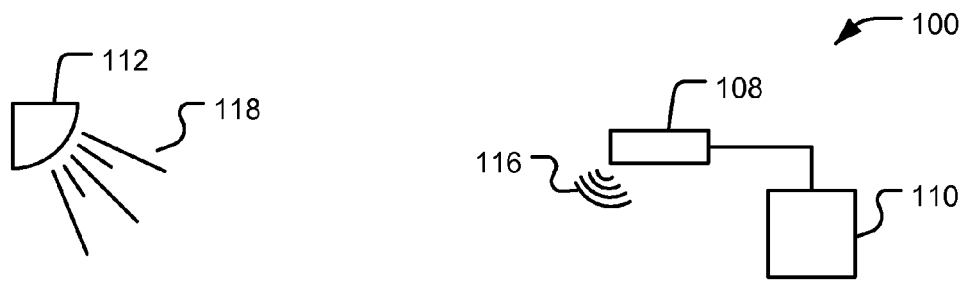
FIG. 1 includes an illustration of an exemplary asset tracking system.
Figure 1:
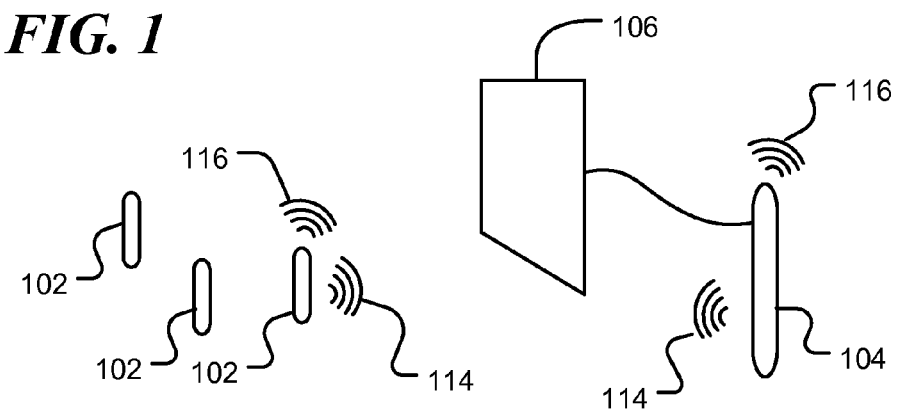

As illustrated in FIG. 1, a system 100 includes a set of asset tags 102 and a detector 104. The set of tags 102 can be associated with assets (not illustrated). As used herein, the term "asset" is used to include personnel, equipment, or a combination thereof unless otherwise stated. The detector 104 can sense an event, such as user actions or autonomous events, and can communicate with the set of tags 102 using signals 114 transmitted in accordance with a radiofrequency (RF) communication protocol. Based on the communication with the tags 102, the event sensed by the detector 104 can be associated with a tag 102 selected from the set of tags 102.

In an example, the detector 104 is communicatively coupled with other equipment 106. In a particular example, the detector 104 is incorporated in or integrated with the other equipment 106. The equipment 106 can respond to events, such as user events. For example, the equipment 106 can be a dispenser activated by a user. In an example, the dispenser can dispense sanitizing lotions, soap, safety equipment, medical supplies or any combination thereof. In particular, the dispenser 106 includes a user interface, such as a lever, a button, a switch, a proximity sensor, a touch sensitive interface, a pressure sensitive interface, or any combination thereof. Activation of such a user interface is sensed by the detector 104. In response, the detector 104 communicates with tags 102 to determine an association between a select tag 102 and the event. In particular, such a system 100 can be used to track compliance with hygiene protocols, use of safety equipment, activation of safety equipment or alarms, patient activities, bedside attendance, compliance with security protocols, or any combination thereof.

The signals 114 can be transmitted in accordance with a short-range radiofrequency protocol. For example, depending upon the use, the protocol can be limited to communications with objects not greater than 75 feet from the detector 104, such as not greater than 35 feet from the detector 104, not greater than 10 feet from the detector 104, or even not greater than 6 feet from the detector 104. In particular, the communication protocol can be limited to communications with tags not greater than 3 feet from the detector 104.

Further, the communication circuitry associated with the signals 114 transmitted from the detector 104 can be directional. For example, the circuitry of the detector 104 can limit the direction or area covered by the signal 114. For example, the detector 104 can include communication circuitry that limits detection to tags on one side of the detector 104. See, for example, FIG. 11. In an example, the communication protocol communicates within frequency bands having a base frequency in a range of 100 MHz to 2.4 GHz, such as a range of 500 MHz to 1 GHz, a range of 600 MHz to 1 GHz, or even a range of 750 MHz to 1 GHz. In particular, the communications protocol can be associated with a base frequency of approximately 915 MHz.

The system 100 can also include a reader 108 in communication with a computational system 110. For example, the reader 108 can communicate signals 116 with a protocol different than that of the signals 114. In a particular example, the signals 116 have a longer range than that of the signals 114. In a further example, the signals 116 can be non-directional. Further, the signals 116 can be broadcast in frequency bands having a base frequency in a range of 100 MHz to 2.4 GHz, such as a range of 200 MHz to 1 GHz, a range of 200 MHz to 600 MHz, a range of 300 MHz to 500 MHz, or even approximately 433 MHz. In a particular example, the frequency of the signals 116 is different than the frequency of the signals 114.

Alternatively, the signals 114 or 116 can utilize the same frequency or set of frequencies. In another example, the signals 114 or 116 can operate using multiple frequencies, for example, under a spread spectrum protocol or frequency-hopped single sideband for energy spreading. In a further alternative, the signals 114 or 116 can be infrared, visible light, or sound signals, or a combination thereof.

In an example, once an association is made between a tag 102 and an event, the association can be communicated to the reader 108 via the signals 116. For example, the detector 104 or the tag 102 can notify the reader 108 of the association. In a particular example, the detector 104 can notify the tag 102 of its association with the event. The tag 102 can signal a user of its association with the event using sound, lights, vibrations or any combination thereof or can notify the reader 108 of the association via a signal 116. In addition or alternatively, the detector 104 can notify the reader 108 of the association via a signal 116. The detector 104 can also signal that an association has been made via light, sound, or vibration. The detector 104 can use light or sound to signal that an event has been detected and an association attempt is in progress or can signal using light or sound to indicate subsequent success or failure of the association attempt. In a further example, the detector 104 can notify each of the detected tags 102 of the selected tag that is associated with the event via a signal 114 and each of the detected tags 102 receiving the signal 114 can notify the reader 108 of the association via the signals 116.

The reader 108 can receive communications from the tags 102 or the detector 104 via the signals 116. Such signals 116 can include the association of a tag 102 with an event detected by the detector 104. In addition, such communications can include tag messages that include associated location identification or a tag identification. The reader 108 can provide such data to a computational circuitry 110, which stores such data for further processing. In particular, the computational circuitry 110 can monitor compliance with hygiene protocols by tracking the association of a tag 102 worn by a user when attending to a patient or performing activities for which hygiene is desirable.

Further, the additional circuitry 110 can track the location of the user or asset associated with the tag 102, such tracking can be utilized for billing purposes, compliance monitoring, productivity monitoring, safety, or any combination thereof. In an additional example, the system 100 can include an infrared beacon 112 providing an infrared beacon signal 118. In a particular example, the tags 102 can include infrared receivers to receive the beacon signal 118 from the infrared beacon 112. The infrared beacon 112 can broadcast a location identifier via the signal 118. The tags 102 can receive the identifier and can provide the identifier as part of communications with the reader 108 via communication signals 116. In this manner, even those tags 102 not detected by the detector 104 can communicate position to the reader 108.

Figure 2:
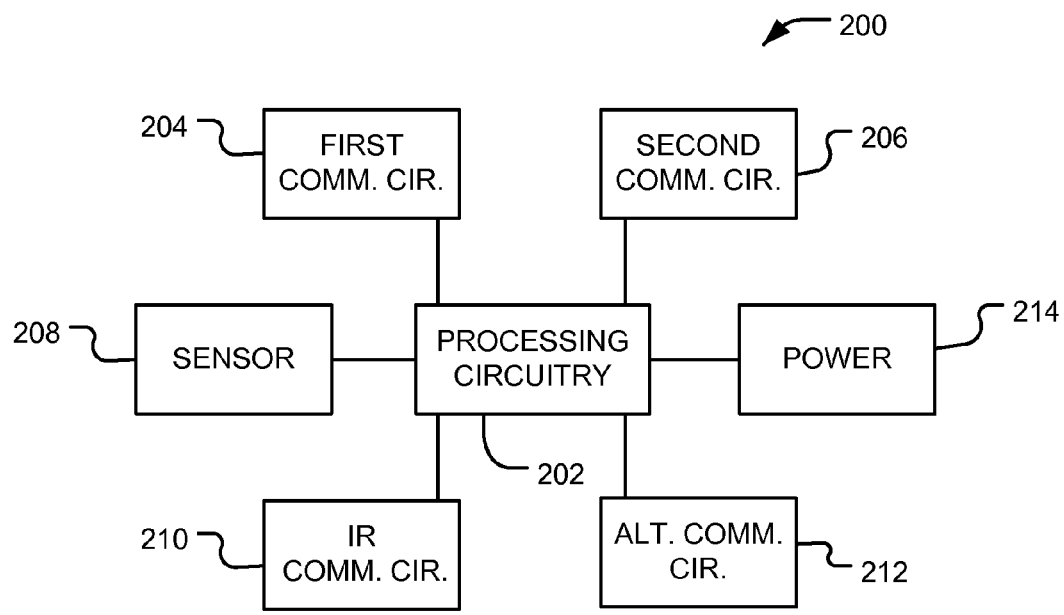
FIG. 2 includes an illustration of an exemplary detector.

The detector 104 can include first and second communication circuitry to communicate using different frequencies and protocols and can include a sensor to detect an event to be associated with the tag. In a particular example, FIG. 2 includes an illustration of the components of a detector 200. The detector 200 includes processing circuitry 202 in communication with a first communication circuitry 204 and a second communication circuitry 206. The processing circuitry 202 can direct communication through the communication circuitry 204 or 206. In addition, the detector 200 includes a sensor 208 to sense an event. The sensor 208 is in communication with the processing circuitry 202.

Optionally, the detector 200 can include infrared communication circuitry 210 or other alternative communication circuitry 212. For example, the processing circuitry 202 can be in communication with an infrared communication circuitry 210 to detect beacon signals from an infrared beacon device. In particular, the infrared beacon device can send a location identifier to be received by the infrared communication circuitry 210 and processed by the processing circuitry 202. Alternative communication circuitry 212 can also be in communication with the processing circuitry 202. In an example, the alternative communication circuitry 212 includes a capacitively coupled communication circuitry, a separate radiofrequency communication circuitry, a sonic communication circuitry, additional infrared communication circuitry, or any combination thereof. Such alternative communication circuitry 212 can be used to communicate with additional sensors or devices. In a further example, the alternative communication circuitry 212 can be a wired communication circuitry such as a universal serial bus (USB) interface, parallel interface, Ethernet interface, proprietary interface, or any combination thereof. In addition, the detector 200 can include further components to support the processing circuitry 202, such as a power supply 214, additional memory, or any combination thereof. In a particular example, the detector 200 is powered by a battery and the detector 200 can be installed without wired power or data cables.

In a particular example, the first communication circuitry 204 is a short-range communication radiofrequency communication circuitry. Further, the first communication circuitry 204 can be a directional communication circuitry, broadcasting over a limited range and area. Such a first communication circuitry 204 can operate at frequency bands having a base frequency in a range of 100 MHz to 2.4 GHz, such as a range of 500 MHz to 1 GHz, a range of 600 MHz to 1 GHz, a range of 750 MHz to 1 GHz, or even approximately 915 MHz. In particular, the first communication circuitry 204 can communicate with tags, such as identification tags associated with assets, such as tags worn by personnel, and signals received by the first communication circuitry 204 can be used to determine a select tag to associate with an event.

The second communication circuitry 206 can be a radiofrequency communication circuitry to communicate with a reader. Optionally, the second communication circuitry 206 is not directional and has a longer range than the first communication circuitry 204. In particular, the second communication circuitry 206 can operate at frequency bands having a base frequency different than the first communication circuitry, such as a frequency in a range of 100 MHz to 2.4 GHz, such as a range of 200 MHz to 1 GHz, a range of 200 MHz to 600 MHz, a range of 300 MHz to 500 MHz, or even approximately 433 MHz.

In a particular example, the processing circuitry 202 detects an event using the sensor 208. In particular, the event can be a user event. A user event is an event initiated by a person or represents actions by a user. The processing circuitry 202 communicates with tags that are in proximity to the detector 200 via the first communication circuitry 204. In an example, the processing circuitry 202 can associate the event with a tag detected by the first communication circuitry 204 based on signal strength, dwell time, changes in signal strength over time, maximum or minimum signal strength, or any combination thereof. The detector can communicate with a tag more than once to determine an association. The communication circuitry 204 can broadcast the identification of the selected tag to the selected tag or optionally, other tags detected by the first communication circuitry 204. In addition or alternatively, the processing circuitry 202 can direct the second communication circuitry 206 to broadcast identification of the selected tag associated with the event to a remote reader.

The system 200 can be used to associate a variety of events with a tag. In particular, the system 200 can be used to associate a user action with a particular tag worn by the user. For example, such a system can be utilized to monitor compliance with hygiene protocols in medical facilities, such as hospitals. A detector can be associated with a dispenser. The dispenser can dispense soap associated with a sink, monitoring compliance with hand washing protocols, or the dispenser can dispense antibacterial lotions, associating the use of such antibacterial lotions with a user.

Figure 3:
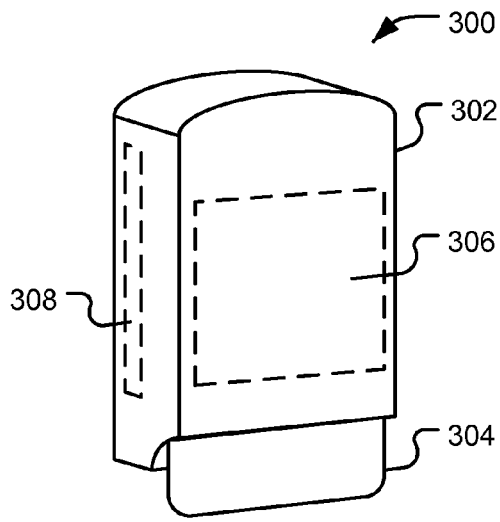
FIG. 3 and FIG. 4 include illustrations of exemplary dispensers.

For example, as illustrated in FIG. 3, a wall dispenser 300 includes a case 302 and a lever 304. Within the case 302 is a container 306 to store soaps, sanitizing lotions, medical supplies, or safety equipment. In addition, a detector 308 can be disposed within the container or case 302. When a user activates the lever 304 to facilitate dispensing of the soap or lotion within the container 306, the detector 308 can detect the activation and communicate with nearby tags to determine a select tag for association with the activation of the lever 304. While FIG. 3 illustrates a wall mounted unit, other form factors can be used.

Figure 4:
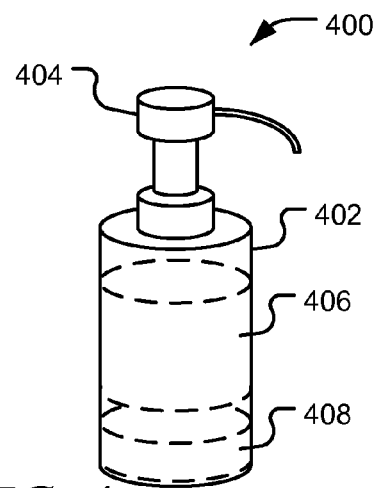

For example, FIG. 4 illustrates a dispenser 400. A case 402 includes a container 406 to store sanitizing lotions or soap. A detector 408 can be disposed within the case 402. When a user activates a pumping mechanism 404, the detector 408 can detect the activation and can communicate with nearby tags to select a tag for association with the activation of the pump mechanism 404.

In a particular example, the dispenser can include one or more sensors. For example, the dispenser can include sensors that communicate a power status (e.g., low battery) or a supply status (e.g., out of a consumable). Data from such sensors can be communicated to a reader, for example, using an RF signal. In an example, the dispenser can be battery operated or can have line power.

A tag for use with the system also includes a communication circuitry to communicate with the detector. Optionally, the tag includes additional communication circuitry to communicate with a reader or infrared beacon. Further, the tag can include notifications circuitry to notify a user of the association of the tag with an event. Exemplary notification circuitry's can include light emitting circuitry, sonic circuitry, vibration circuitry, or any combination thereof.

Figure 5:
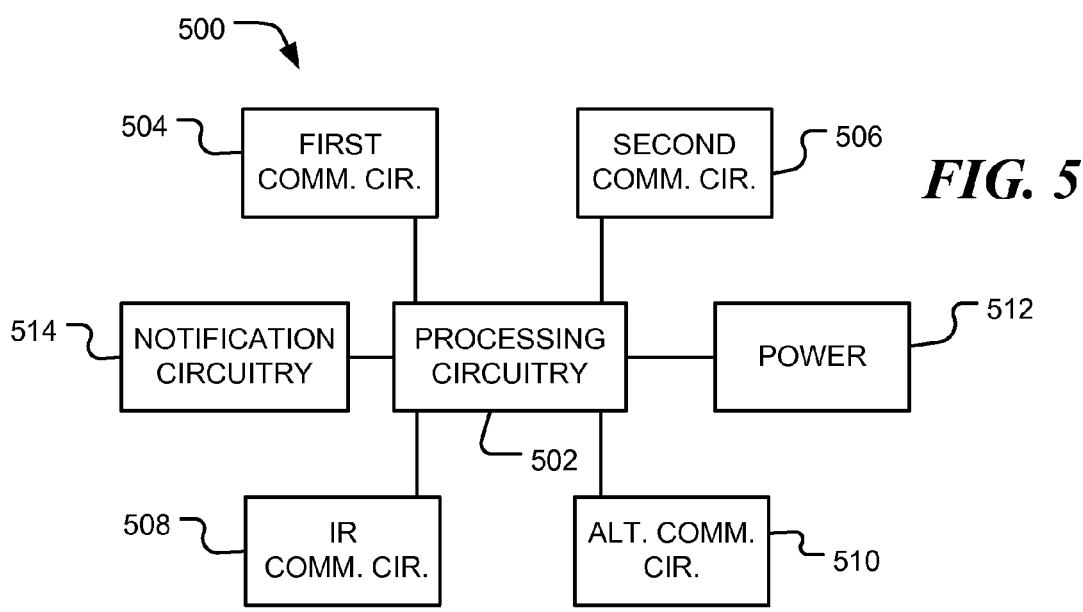
FIG. 5 includes an illustration of an exemplary asset tag.

For example, as illustrated at FIG. 5, a tag 500 includes a processing circuitry 502 in communication with a first communication circuitry 504. The first communication circuitry 504 communicates with a protocol at a frequency similar to that of the first communication circuitry of the detector. In addition, the tag 500 can include a second communication circuitry 506 communicatively coupled with the processing circuitry 502. The second communication circuitry 506 can utilize a protocol and frequency for communicating with a reader, such as that associated with the second communication of the detector. In particular, the first communication circuitry 504 or the second communication circuitry 506 can be omnidirectional.

Optionally, the tag 500 can include an infrared communication circuitry 508 communicatively coupled with the processing circuitry 502. In particular, the infrared communication circuitry 508 can receive a beacon signal from an infrared beacon device. The beacon signal can include an identification or location identification for processing by the processing circuitry 502. Further, the tag 500 can include an alternative communication circuitry 510. The alternative communication circuitry 510 can include capacitively coupled communication circuitry, a separate radiofrequency communication circuitry, a sonic communication circuitry, additional infrared communication circuitry or any combination thereof.

The tag 500 can also include a notification circuitry 514. The notification circuitry can notify a user of the association of a select tag 500 with an event. For example, the notification circuitry 514 can include light emitting circuitry, sonic emitting circuitry, vibration circuitry, or any combination thereof. In an example, the sonic emitting circuitry can be a piezo circuitry. The tag 500 can also include additional circuitry and components to support the processing circuitry 502. For example, the tag 500 can include a power supply 512, additional memory, sensors, such as a motion sensor, or any combination thereof.

Optionally, the tag 500 can include a button, such as a panic button, that can signal security or emergency personnel. Further, the tag 500 can alert a user when entering particular areas, such as a hazardous zone. In another example, the tag 500 can indicate whether a user can access a particular area.

In a further example, FIG. 6 includes an illustration of a tag 600, including a case 602 enclosing a circuitry 604, battery or power cells 606, a light pipe 608, and infrared sensors 610.

The circuitry 604 includes processing circuitry, radiofrequency communication circuitry, alternative communication circuitry, notification circuitry, power supplies, additional memory, sensors, or any combination thereof. The light pipes 608 are configured to receive visible or infrared signals and direct them to the receivers 610, such as infrared receiver. The receivers 610 are communicatively coupled to circuitry 604. In addition, the batteries or power cells 606 are disposed around and in cooperation with the light pipes 608. As illustrated in FIG. 7, battery or power cells 606 can be inset through the circuit board, allowing for a thinner profile of the tag 600. Optionally, the tag 600 can be housed in an IR transparent container.

Figure 8:
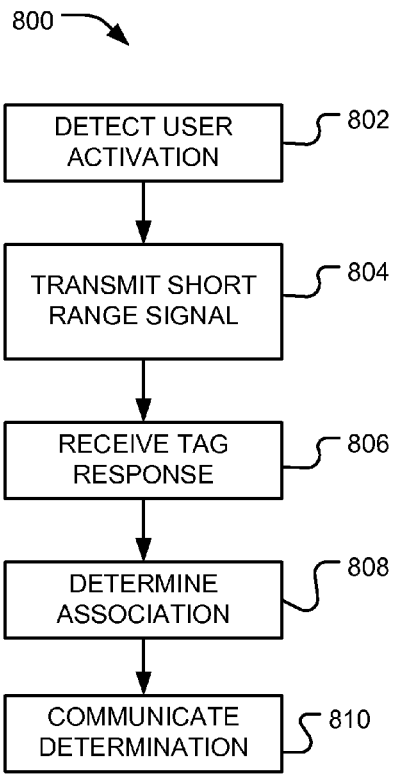
FIG. 8, FIG. 9, and FIG. 10 include flow diagram illustrations of exemplary methods of asset tracking.

In practice, such an asset tracking and event association system associates a selected tag with an event and stores the selected tag or association for further processing. As illustrated in FIG. 8, a method 800 includes detecting user activation, as illustrated at 802. For example, a detector can detect an event based on the user activation of a button, lever, switch, pumping mechanism, proximity sensor, touchpad entry, or any combination thereof. Alternatively, the detector can detect an autonomous event.

The detector can transmit a short-range signal, as illustrated at 804. For example, the detector can transmit a short-range directional signal to detect tags that are nearby. As illustrated at 806, the detector can receive the tag responses. Such a tag response can include a tag identification, as well as other information associated with the communications, such as a strength of the signal received by the tag, a time associated with receiving the signal at the tag, a time associated with a transmission from the tag, a location ID, motion sensor data, other sensor data, location data, or any combination thereof. The tag and detectors can communicate multiple times before an association is determined. For example, the detector and the tags can exchange signal strength over multiple beacons to determine event association.

As illustrated at 808, a tag can be selected for association with the event. For example, the tag association can be determined based on signal strengths of transmissions received by the tag, signal strengths of transmissions received by the detector, maximum or minimum signal strengths, dwell times, changes in either the tag or detector received signals strengths over time, motion sensor data, or any combination thereof. In a particular example, the detector can determine the association between a select tag and an event. Alternatively, the detector can communicate with the reader and the reader or associated computational circuitry can determine the association with the event.

The detector can communicate results of the association of the select tag with the event to the tags or a reader, as illustrated at 810. For example, the detector can communicate to the tags the identification of the tag associated with the event. The tag associated with the event can activate notification circuitry, such as light emitting circuitry, sonic circuitry, vibrational circuitry, or any combination thereof, to notify a user that the user's tag has been associated with the event. Tags not credited with the association can also receive the communication from the detector, identifying the select tag that is associated with the event. The tags can optionally communicate the association with a reader. In addition or alternatively, the detector can communicate the association with a reader.

Figure 9:
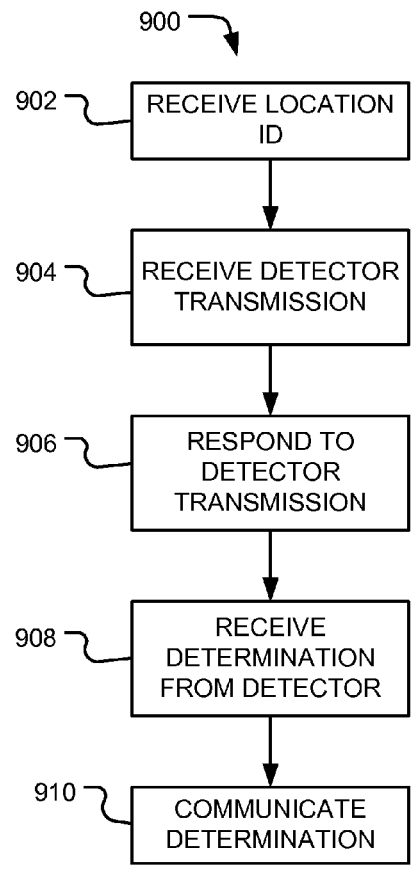

The tag receives a communication from a detector and provides the tag's identification and optionally additional data to the detector. The tag can also receive a communication indicating its selection for association with the event and can indicate the selection to a user associated with the tag. As illustrated in the method 900 of FIG. 9, a tag can receive a location identification, as illustrated at 902. For example, the tag can receive a beacon signal, providing a location identification. In an example, the beacon signal can be an infrared (IR) beacon signal including a location identifier.

In addition, the tag can receive a transmission from a detector, as illustrated 904. In particular, the detector can transmit signals to locate proximal tags in response to detecting an event. The tag can respond to the detector, as illustrated 906. In particular, the tag can respond with its tag identification. Optionally, the response to the detector can include a signal strength of the signal received from the detector, a timestamp of the signal received or signal transmitted, a location identification (for example, received from an IR beacon), motion sensor data, or any combination thereof. The tag and detectors can communicate multiple times before an association is determined. For example, the detector and the tags can exchange signal strength over multiple beacons to determine event association.

The detector or other circuitry can process communications received from tags and can determine the select tag associated with an event. The tag can receive communication based on the determination from the detector, as illustrated at 908. In particular, the detector can transmit and a tag can receive the identification of the select tag associated with the events. The tag can further communicate that determination, as illustrated in 910. For example, the tag can notify a user of the determination using a light signal, sonic signal, vibration, or any combination thereof. Further, the tag can communicate with the remote reader providing its tag ID, the received location ID, the tag ID of the tag associated with the events, other payload data, or any combination thereof. In addition, the tag can confirm receipt of the determination. Optionally, the tag can be configured report to a reader when the tag does not receive a message indicating the determination.

Figure 10:
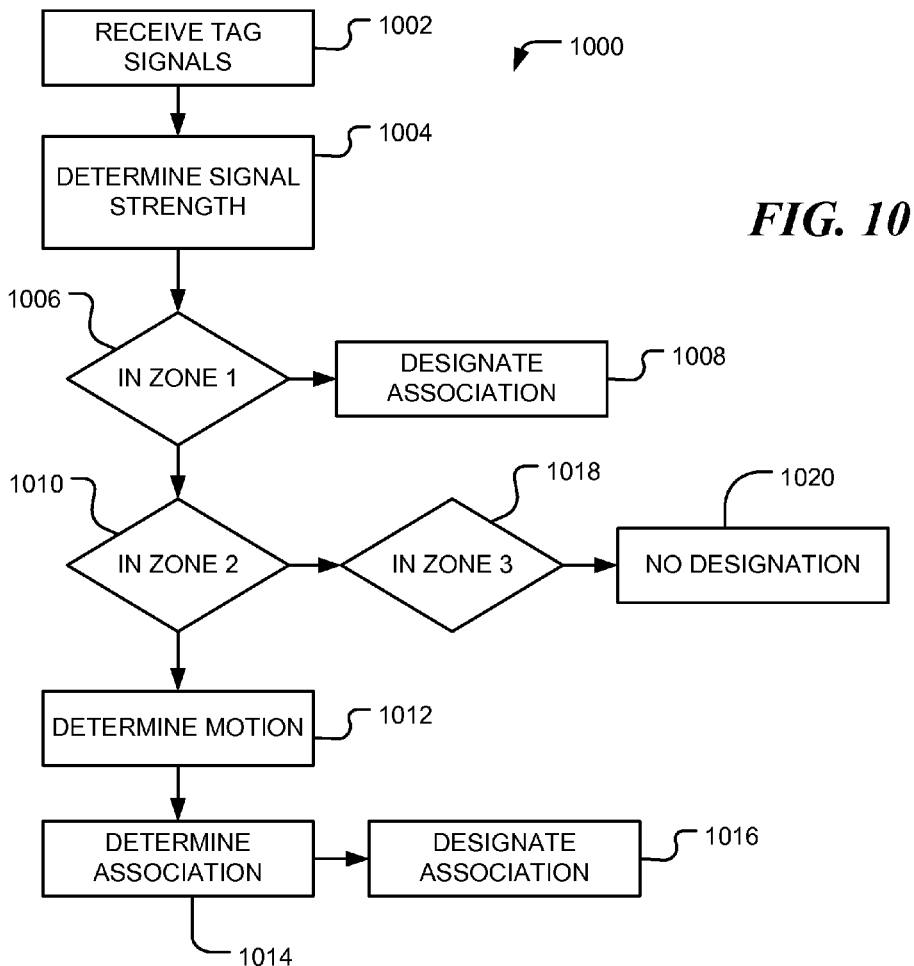

In a particular example, a detector or other computational circuitry can utilize zone-based logic to determine which tag to select for association with a detected event. As illustrated in the method 1000 of FIG. 10, a tag signal can be received, as illustrated at 1002. The tag signals can include tag identifications. In addition, tag signals can include data such as the signal strength of the signal received by the tag, timestamps associated with receiving the signal or transmitting the signal, location identifications associated with the tag, other sensor data, or any combination thereof.

Figure 11:
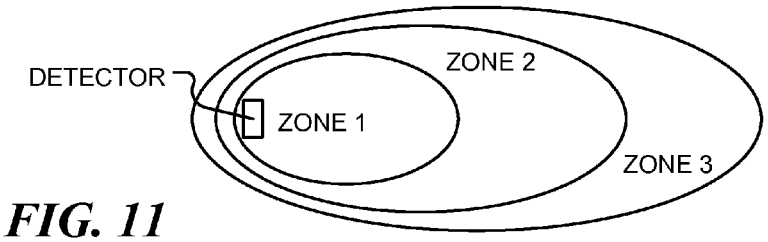
FIG. 11 includes an illustration of an exemplary zone designation for use in a method of tracking an asset.

In an example, the detector or other computational circuitry can determine the signal strength associated with each signal received, as illustrated 1004. Such signal strength can be compared with thresholds to determine when the tag is located within a zone. As illustrated in FIG. 11, several zones can be designated based on signal strength thresholds. For example, three zones can be designated in which zone 1 represents a higher signal strength threshold than zone 2 or zone 3.

When the tag is determined to be within zone 1, as illustrated 1006, and no other tag is within zone 1, the tag can be selected for association with event, as illustrated at 1008. When no tag is determined to be within zone 1, the detector or computational circuitry determines whether the tag is within zone 2, as illustrated 1010. When the tag is not located within zone 2 and is outside of zone 2, such as being in zone 3, as illustrated at 1018, the tag is not associated with event, as illustrated at 1020.

When the tag is within zone 2, a direction of motion can be determined, as illustrated 1012. For example, the detector or other computational circuitry can determine, based on changes in signal strength over time, which direction the tag is traveling or test the tag for dwell time at one particular zone relative to others. For example, when a tag is moving from zone 1 to zone 2 and subsequently zone 3, the detector can determine that the tag should be associated with the event. In such a manner, a tag can be associated with an event, as illustrated at 1014, and the association designated, as illustrated at 1016.

Returning to FIG. 11, in a particular example, zone 1 can represent the physical area in which the signal strength from the detector or locator is above a user-settable "immediate" threshold. Such an area is close to the detector or locator such that, under normal operating conditions, only one person, and therefore only one badge, can be within zone 1 at any given time. Following a proximity event activation, if a badge's signal strength indicates it is within zone 1, the badge is given immediate credit for the proximity event.

Zone 2 represents the physical area in which the signal strength from the detector or locator is below the "immediate" threshold but above a user-settable "candidate" threshold. Following a proximity event activation, when a badge's signal strength indicates it is within zone 2, the badge is considered a candidate to receive credit for the proximity event. Multiple polling cycles can be used to collect responses from badges in zone 2 to ensure that the badges respond and the badge with the strongest response to any of the polling cycles receives credit for the proximity event.

Zone 3 represents the physical area in which the signal strength from the detector or locator is below the "candidate" threshold but still high enough to allow communication between the detector or locator and a badge. Badges within zone 3, although detectable, are not considered candidates to receive credit for a proximity event.

The signal strength from the detector or locator in the area outside of zone 3 is too weak to allow communication between the detector or locator and a badge. Badges in this area may not be detectable. In a further example, the detector can use relative metrics alternative to or in addition to the absolute metrics of the predetermined zone thresholds.

Following a proximity event activation, the detector or locator begins a series of polling cycles to collect badge responses from badges in zone 1 and zone 2. When a badge in zone 1 responds to any polling cycle, it is immediately given credit for the proximity activation and no further polling cycles are used. Otherwise, the detector or locator continues polling. After a certain number of polling cycles with at least one badge responding from zone 2, the detector or locator gives credit to the badge with the strongest RSSI (received signal strength indication). The strongest RSSI is the maximum RSSI that a given badge reported in any one of the polling cycles. If no badge responds within a certain number of polling cycles, the detector or locator does not give any credit for the proximity event.

In an additional example, associations can be determined based on signal strength, changes in signal strength, or dwell time, among other factors. In particular, when more than one tag is in a particular zone, a determination regarding association with an event can be made based on a combination of factors. For example, when more than one tag is located in a zone, one or more factors can be used to determine which tag is to be associated with the event. In a particular example, the system can determine which tag is mostly likely to be the tag associated with the event based on zone discrimination, as described above, in addition to relative signal strength, changes in signal strength or dwell time. Such factors can be measured across multiple communications with a tag to determine a scalar indicator. Scalar indicators of more than one tag can be compared to determine which tag to associate with the event. For example, the system can determine which tag is the closest for the longest period.

These are some of the advantages of this 3-zone method of proximity determination. For example, badges within zone 1 can be given credit for the proximity event quickly. A quick determination is often needed when the dwell time of the badge is short. Badges within zone 2 are given multiple polling cycles to respond. Such polling ensures the most accurate RSSI is determined so that the correct badge is given credit for the proximity event. A badge that moves from zone 1 or zone 2 into zone 3 can still communicate with the detector or locator and therefore, still receive credit for the proximity event even if it is in zone 3 at the time when the winner is decided and announced. Because the "candidate" and "immediate" thresholds as well as the polling cycle can be user-adjustable, the detector or locator can be adapted to monitor a variety of different proximity events depending on the range and dwell time requirements of each situation.

The detector or locator can analyze the change in RSSI for each badge from one poll cycle to the next in order to help determine the relative motion of the person wearing the badge. The decision logic can favor a person walking toward the detector or locator, away from the detector or locator, or a stationary person depending on the expected activation scenario.

The badges can report RSSI information directly to the zonal readers. Such badges can allow the proximity determination logic to be handled by the upper-level software system which likely has more knowledge of the status of each component in the system. For instance, the upper-level software system might know which room the badge was in before and after the proximity event, as well as the recent history of proximity event activations. Such knowledge can be used to influence the decision of which badge should receive credit for a proximity event.

Figure 12:
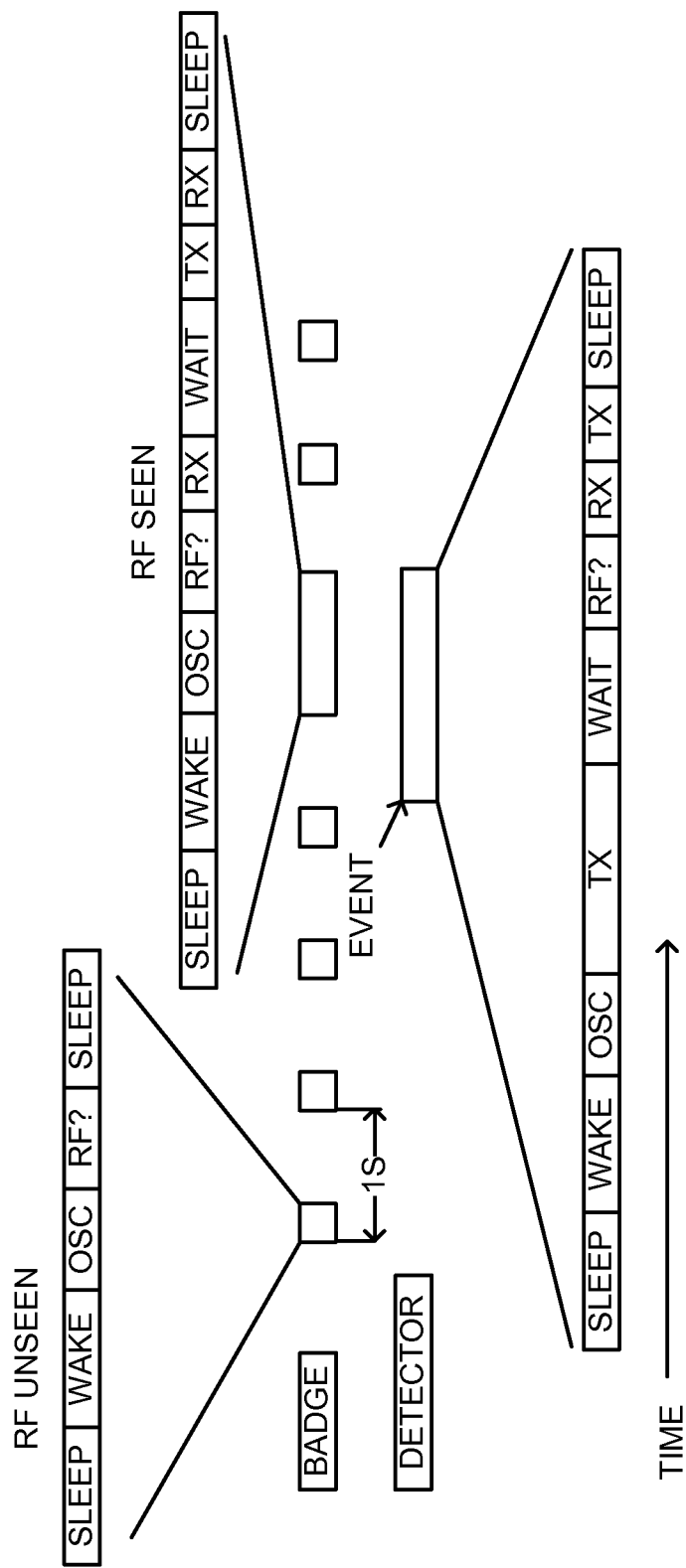
FIG. 12 includes an illustration of exemplary communication between a tag and a detector.

In a particular embodiment, a tag periodically listens for a communication from a detector. As illustrated in FIG. 12, a tag, such as a personnel badge, periodically wakes, listens for a transmission from the detector (turning oscillator on), and when no transmission is received returns to sleep. In an example, the tag periodically wakes at periods between 0.01 seconds and 5 seconds, such as periods between 0.1 seconds and 3 seconds, between 0.5 seconds and 2 seconds, or even about 1 second.

When the detector is activated, the detector wakes, listens for activity on the frequency band (turning oscillator on). Once the channel is clear, the detector starts a transmission. In an example, the detector sends repeating broadcast messages to be received by a nearby tag. For example, the message can include timing information so that the tags know when the response window starts. The detector can listen for a response.

The tag can awake and listen for the detector message during the transmission from the detector. When the tag receives a broadcast, the tag can await the transmission window and transmit a response to the detector message. In particular, the tag can transmit a response based on the transmitted timing information plus an offset based on the tag's identification or a pseudo random offset.

The detector can receive transmissions from one or more tags. A winning tag can be selected, and the detector can send a transmission indicating the winning tag. Optionally, the detector can send additional transmissions if additional information would be useful to determine a winning tag. In another example, the winning tag can transmit a message to the detector to acknowledge receipt of the message or can transmit to a central system using a different frequency.

Figure 13:
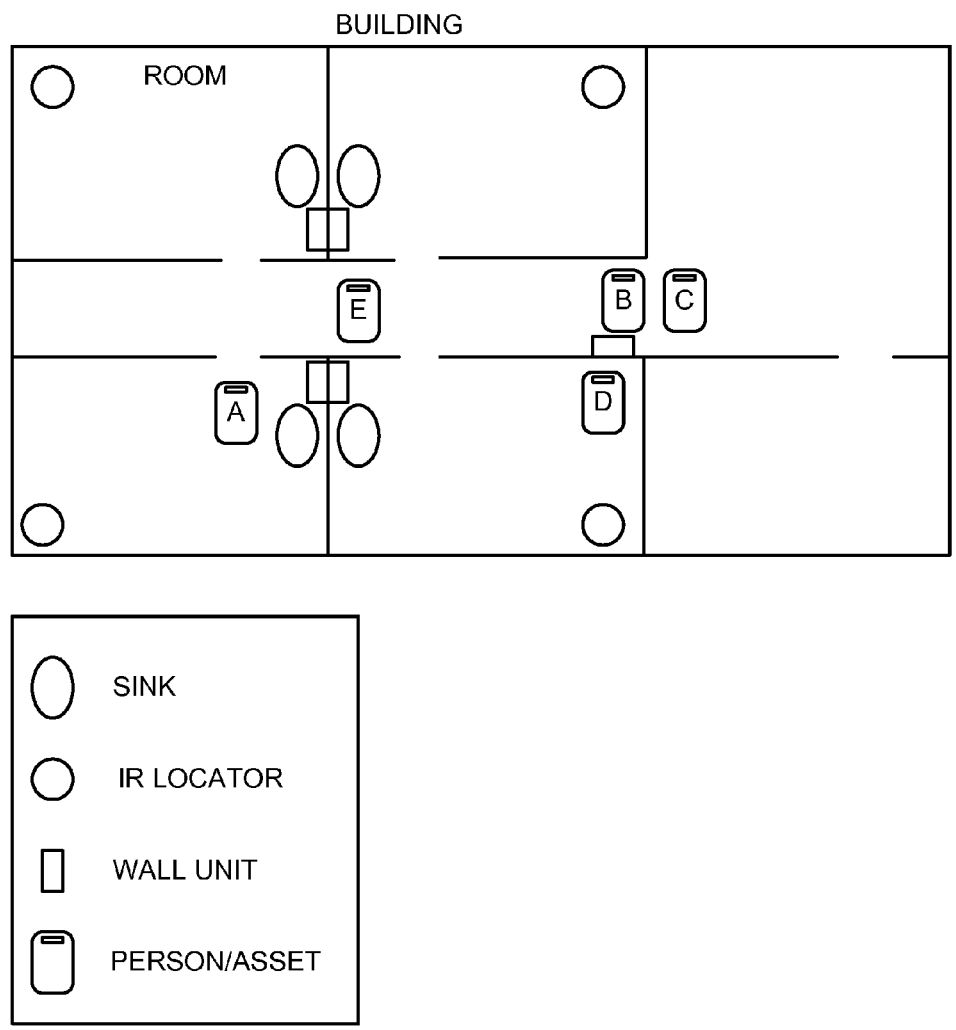
FIG. 13 includes an illustration of an exemplary implementation of a tracking system.

In an exemplary implementation, a detector, such as a wall unit, is installed throughout a facility, such as a facility illustrated in FIG. 13. In an example, the facility is a hospital and the wall units are in proximity to or integrated into a soap or sanitizer dispenser. In other places in the hospital, an active RFID reader receives data from asset tags. In this example, the asset tag is in the form of a personnel badge. The wearer of the badge traverses the hospital building without active acknowledgement of the tracking system.

In a particular example, compatibility of the wall unit and badges with an IR location system and the presence of an active RFID reader provide asset tracking of the assets. The badge tag, however, periodically monitors the RF energy of an RF communications channel different from that used by the active RFID reader, as described above. When no signal is detected, the process is repeated by the software and hardware in the badge tag. When someone activates (triggers) a soap or sanitizer event, the wall unit initiates a query, using the RF communications channel. The badge tags which are a) in RF proximity and b) have a sufficient RF power level as decided by the software, begin a reply sequence. The interaction can be performed in a number of ways. In this example, the asset tags in the area communicate with the wall unit, exchanging ID information and signal strength. Over a period of time after the event activation, the wall unit continues to communicate with badge tags. The wall unit can assess the following metrics of multiple assets in proximity: a) signal strength, b) dwell time, c) change in signal strength over time, or d) min/max signal strength, among others.

By using programmed logic in the processor, the wall unit or a central system can determine derived reports, such as the most probable person who washed their hands or who opened a door or rack, for example. Such processing could be done upstream by an aggregator device receiving raw information from the system. More processing and decision making power can be available upstream from the tags or wall units.

When the wall unit antenna has an optional directional field bias, the antenna field characteristics provide an additional level of discrimination such that those assets in a favored position get an enhanced chance to be associated with an event. In the hospital hygiene example, the favorable position would be in front of a sink.

In the illustrated example of FIG. 13, a user A activates the soap dispenser in the room. The wall unit, through interaction with a mechanical or electrical signal from the dispenser, can begin to signal the asset tags. When the tag can receive a signal via RF and the response signals are above a certain signal strength using the RF communications channel, the wall unit can detect A and E and possibly B, C and D. Tag E can be traveling away or towards the wall unit. Other tags can be both further away and can have a signal level less consistent during the determination period. Using the metrics listed above and the optional enhancement of the directional antenna, the wall unit determines that A is washing at the dispenser. The wall unit communicates to A, telling A that it was chosen as the asset associated with the event. The asset tag A can provide an optional beep, vibrate, activate an LED or provide another indication that it was selected.

In particular, the system can autonomously and apparently continuously monitor the proximity of an asset to a location and reports to a wide area network via active RFID the events and associations in the area the system has been configured to monitor or track. For the hospital soap example, the system reports business metrics such as soap dispensing events, soap levels, dispenser and self battery life, but also decides and reports the probable persons that initiated the event and washed or sanitized themselves, usually their hands. The spatial preference of the optional directional antenna is used to help discriminate adjacent dispensers, persons or assets in close proximity and focus the system's decision to a specific area. In addition, scalar metrics like signal strength, dwell and time domain function are used to filter and prioritize multiple possible assets. The gross proximity resolution of the system can be tunable from inches to hundreds of feet.

Furthermore, arbitrary data can be payloaded between the 'winner' asset tag and the wall unit and thus transmitted over a wide area network (WAN), the winner, for example, being the most probable closest asset. The non-winner assets in range can also exchange data and similarly payload to the WAN for additional information to the higher level reporting system.

When enhanced by the presence of an infrared locator, the asset tag provides the IR room location functions. The IR location can be used in the association by the detector or processing software operating on separate equipment, such as a reader or remote computational circuitry.

The exemplary implementation can have a motion detector that is used to conserve battery life. The motion feature can also be reported or used to enhance the IR location feature, as well as the proximity detection. In particular, motion sensor can provide a scalar value. Motion measured during washing of hands or running can be measured and contrasted with sitting, for example.

In a particular embodiment, the basic system includes an asset tag, a wall unit, or a WAN gateway(s) RFID reader. Optionally, the system can include infrared (IR) locator(s) or asset management, reporting and alerting software.

In alternative embodiments, the system can be used to detect events such as a truck on a scale. Other uses include tracking construction workers on and off a job site, compliance with personal sanitation regulations, automated checkout, bed level patient tracking in a dense population emergency room, real time personnel locator, audit trail, security guard rounds verification, detection, alarm and reporting of who opened a door, cabinet, or who removed an item, automatic toll collection, access control or billing based on proximity, or any combination thereof. For example, in the security application, the guard does not have to use a key to indicate his presence at a point in his/her rounds. In another example, hospital personnel do not have to alter the hand washing protocols, such as pressing a button, scanning a badge or other user intervention, to get credit and monitoring of the hygiene protocol.

In particular, tags communicate with a detector to compete to be associated with an event. One or more tags are associated with the event and one or more tags can be excluded from the association. The communication between the tags and the detector can be triggered by the event. The event can be an event triggered by a user action (i.e., a user event) or can be triggered by a sensor or device irrespective of a user action (e.g., an autonomous event). An exemplary user event can be activation of a switch, button, lever, touch pad, proximity sensor, or any combination thereof, particularly as part of a normal user activity. In particular, the user does not alter their normal behavior to facilitate an event and initiate the communication between the detector and the tags. For example, the user does not actively swipe a tag in addition to their normal behavior and the activated event is not exclusively tied to the detector or event association. An autonomous event is sensed irrespective of a user activity and can include, for example, detection of a radiation release, a machine failure, or a chemical leak. In either case, the association of a tag and an event is triggered and performed without altering the activity of a user. In an alternative example, the user can alter their behavior, for example, activating a button specific to the detector.

In another embodiment, the system can be used to determine potential exposure to a chemical leak by associating tags within an exposure zone with a release event. For example, a detector can detect a chemical or radiation release and can communicate with tags within a proximity to associate tags in an exposure zone with the release event.

In an additional embodiment, the system can be used to associate access to valuables with a person accessing the valuables. For example, when a jewelry cabinet is accessed at a store, opening of the cabinet can trigger a detector to communicate with tags and associate an employee with opening the cabinet. Optionally, the system can track one or more tags proximal to access points of valuables, including jewelry, money, artifacts, art, or any combination thereof.

In a particular embodiment, an exemplary system contains two radios. A 915 MHz radio in the asset tag is used for bidirectional proximity communications with a locator which has a similar radio. A 433 MHz radio is transmit only on both devices and caries the status, event, activity, ID and location payloads to the WAN gateway or active RFID reader.

The 915 MHz radio acts as a proximity detector, using very low power RF and sensitive receivers. The 915 MHz antenna pattern on the badge tag is unidirectional while the detector (e.g., wall unit) antenna radiation pattern can be designed to provide the system a spatial or positional bias. In the hospital soap monitoring application, the wall unit's beam pattern is focused to a narrow half doughnut in front of the unit. Such a pattern is to help reject communication from asset tags behind or to the side of the washing or soap application location.

Status, user button pushes, tamper, motion, periodic beacons, IR locator proximity, soap levels, battery levels, etc. are transmitted periodically to the 433 MHz active RFID reader. These readers are usually connected to a LAN or WAN, presenting the opportunity for real-time monitoring and asset management.

In the hospital soap/washing example, the wall unit or locator, which could be integral to a soap dispenser, is triggered by the physical pushing of the soap actuator or by other electronic means, waiving a hand in front of a properly equipped automatic dispenser, for example. In other applications, the locator can be triggered by a motion sensor, broken IR beam, door switch, pressure-switch floor mat, etc.

A low power RF exchange occurs in the 915 MHz band among the locator and the various tags in the RF listening range. This range is adjustable by several means. The gain and directionality of the antennas affect the possible range. The software-controlled transmit power and optional amplifiers can also increase or decrease the proximity system's range. Further, software filters and hardware thresholds can be used to limit the visibility of the proximity system. This limiting becomes important and valuable when asset tag density becomes high. The range of the system can be varied from 1 foot to 1000 feet. Alternatively, the range can be extended to miles. Inside this range, the system can make decisions not only that the asset is in view or present, but by using certain scalar means, can make decision about closeness, dwell time and movement. In the soap/hand washing example, the wall unit uses several communications over a period of time to 'look' at the tags (e.g., badges) in proximity. The signal strength or SSID is used and analyzed over time to decide which of the tags is most probably attached to a person who is or has just used the soap or sanitizer dispenser. By looking at dwell time, relative signal strength, change of signal and dropped signals over time, a picture of elements in proximity is created by the locator. After a decision is made, the results are payloaded over the 433 MHz radio.

Such results and any other data can be also 'payloaded' in a strong broadcast over the 915 MHz radio. In addition, a different system is envisioned where the raw information collected is payloaded over a radio or other communications means so the more capable and wider scope application above can make decisions with more certainty or greater means.

In a particular example, a detector is associated with a system to dispense a consumable. For example, the detector can be integrated into a housing of the dispenser or can be in a separate housing. The detector can communicate with tags to associate a dispensing event with a tag. In addition, the detector can include sensors to detect power status (e.g., low battery) or supply status (e.g., out of the consumable). The dispenser can dispense a consumable. In a medical context, an exemplary consumable can include soap, disinfectant, gloves, needles, pharmaceuticals, other medical supplies, or a combination thereof. In a consumer context, the consumable can include food and drink (e.g., soda or juice), over the counter medications, office supplies, or other dispensable items. The detector can determine which tag to associate with the dispensing. In another example, the detector can determine that the dispensing is not associated with a tag or is associated with an unauthorized tag. The detector can send notification of an unauthorized dispensing and the system can provide notification of such a dispensing.

In a further example, a detector can be associated with a waste system to determine which tag is associated with providing waste. Such a detector may be beneficial in situations where recycling is tracked. In a medical context, such a detector can be beneficial when tracking hazardous or biological waste, for example, when disposing of a needle. In a particular example, both dispensing of a needle and depositing the needle in a hazardous waste container can be tracked and associated.

In an additional example, a detector can be used in a data center. For example, the detector can determine which tag to associate with accessing a panel, rack, or cabinet. The detector can be triggered by the opening of a cabinet or rack door. In another example, the detector can communicate with tags when a tracking device or security device is disconnected. In such a manner, authorized and unauthorized accessing of equipment can be tracked.

In a first aspect, a system includes a detector including a sensor to detect an event and a communication circuitry to communicate at a first frequency band. The system further includes a reader comprising communication circuitry to communicate at a second frequency band. The system also includes a tag including a first communication circuitry to communicate at the first frequency band and a second communication circuitry to communicate at the second frequency band. The detector is to communicate with the tag via the communication circuitry of the detector. The detector is to determine whether to associate the tag with the event. The detector is to communicate the determined association. The tag is to communicate using the second communication circuitry of the tag with the reader.

In an example of the first aspect, the event is a user event. In another example of the first aspect, the event is an autonomous event.

In a further example of the first aspect or the above examples, the detector is to communicate the determined association to the tag. For example, the tag is to communicate the determined association to the reader using the second communication circuitry of the tag. In another example, the tag is to confirm receipt of the determined association using the first communication circuitry. In a further example, the tag includes a notification circuitry to notify a user in response to receiving the determined association.

In an additional example of the first aspect or the above examples, the detector includes a second communication circuitry to communicate at the second frequency band and wherein the detector is to communicate the determined association to the reader.

In another example of the first aspect or the above examples, the first frequency band is in the range of 750 MHz to 1 GHz.

In a further example of the first aspect or the above examples, the second frequency band is in the range of 300 MHz to 500 MHz.

In an additional example of the first aspect or the above examples, the first and second frequency bands overlap.

In an example of the first aspect or the above examples, the system further includes a dispenser including a user interface communicatively coupled to the sensor of the detector, the detector to communicate with the tag in response to activation of the user interface.

In another example of the first aspect or the above examples, the system further includes a beacon device to transmit an infrared beacon signal including a location identifier. For example, the tag further includes an infrared receiver to receive the infrared beacon signal. In an example, the tag is to communicate the location identifier of the received infrared beacon signal to the reader using the second communication circuitry.

In a further example of the first aspect or the above examples, the communication of the detector is a short-range communication circuitry having a range of not greater than 10 feet.

In a second aspect, a detector includes a sensor to detect an event, a first communication circuitry to communicate at a first frequency band, the first communication circuitry being directional, a second communication circuitry to communicate at a second frequency band, and the detector to communication with a tag using the first communication circuitry in response to a user event detected via the sensor. The detector is to associate a select tag with the user event. The detector is to communicate the association using the first or second communication circuitry.

In an example of the second aspect, the event is a user event. In another example of the second aspect, the event is an autonomous event.

In a further example of the second aspect or the above examples, the detector is to communicate the association using the first communication circuitry to the select tag.

In an additional example of the second aspect or the above examples, the detector is to communicate the association using the second communication circuitry to a reader.

In another example of the second aspect or the above examples, the first communication circuitry is a short-range communication circuitry having a range of not greater than 10 feet.

In a further example of the second aspect or the above examples, the sensor is associated with a dispenser.

In another example of the second aspect or the above examples, the first frequency band is in the range of 750 MHz to 1 GHz.

In an additional example of the second aspect or the above examples, the second frequency band is in the range of 300 MHz to 500 MHz.

In a third aspect, a tag includes a processor, a first communication circuitry communicatively coupled to the processor and to communicate at a first frequency band, a second communication circuitry communicatively coupled to the processor and to communicate at a second frequency band, a notification circuitry communicatively coupled to the processor, and the processor to direct the first communication circuitry to communicate with a detector, the tag to receive a message indicating an association with an event. The processor is to direct the notification circuitry to notify a user in response to receiving the message.

In an example of the third aspect, the first communication circuitry is a short-range communication circuitry having a range of not greater than 10 feet.

In another example of the third aspect or the above examples, the first frequency band is in the range of 750 MHz to 1 GHz.

In a further example of the third aspect or the above examples, the second frequency band is in the range of 300 MHz to 500 MHz.

In a fourth aspect, a dispenser includes a container, a user interface to facilitate dispensing from the container, and a detector. The detector includes a sensor to detect a user event via the user interface, a first communication circuitry to communicate at a first frequency band, the first communication circuitry being directional, and a second communication circuitry to communicate at a second frequency band. The detector is to communication with a tag using the first communication circuitry in response to the user event detected via the sensor. The detector is to associate a select tag with the user event. The detector is to communicate the association using the first or second communication circuitry.

In an example of the fourth aspect, the detector is to communicate the association using the first communication circuitry to the select tag.

In another example of the fourth aspect and the above examples, the detector is to communicate the association using the second communication circuitry to a reader.

In a further example of the fourth aspect and the above examples, the first communication circuitry is a short-range communication circuitry having a range of not greater than 10 feet.

In an additional example of the fourth aspect and the above examples, the first frequency band is in the range of 750 MHz to 1 GHz.

In another example of the fourth aspect and the above examples, the second frequency band is in the range of 300 MHz to 500 MHz.

In a fifth aspect, a method of determining an association between a tag and a user event includes detecting an event, transmitting a message to a tag via a short-range frequency band communication circuitry, receiving a response message from the tag via the short-range frequency band communication circuitry, determining an association between the tag and the user event based on a characteristic of the response message, and communicating the determined association.

In an example of the fifth aspect, the event is a user event. In another example of the fifth aspect, the event is an autonomous event.

In a further example of the fifth aspect and the above examples, communicating the determined association includes communicating the determined association to the tag.

In an additional example of the fifth aspect and the above examples, the method further includes communicating the determination from the tag to a user via a notification circuitry.

In another example of the fifth aspect and the above examples, the method further includes communicating the determination from the tag to a remote reader via a second communication circuitry.

In a further example of the fifth aspect and the above examples, communicating the determined association includes communicating the determined association to a remote reader.

In an additional example of the fifth aspect and the above examples, the short-range frequency band communication circuitry is directional.

In another example of the fifth aspect and the above examples, determining the association includes determining based on a signal strength characteristic of the response message.

In a further example of the fifth aspect and the above examples, determining the association includes determining based on a movement characteristic of the response message.

In a sixth aspect, a method of determining an association between a tag and a user event includes receiving a tag signal at a detector in response to an initial signal from the detector, determining whether the tag is located in a first zone or second zone based on a signal strength associated with the tag signal, and selecting the tag for association with the user event when the tag is located in the first zone.

In an example of the sixth aspect, the method further includes receiving an additional tag signal and when the tag is located in the second zone, determining a movement characteristic associated with the tag and selecting the tag for association with the user event based on the movement characteristic.

In a further example of the sixth aspect and the above examples, the method further includes communicating the association with the select tag.

In another example of the sixth aspect and the above examples, the method further includes notifying a user of the association using a notification circuitry of the select tag.

In an additional example of the sixth aspect and the above examples, the method further includes communicating the association from the select tag to a remote reader.

In another example of the sixth aspect and the above examples, the method further includes communicating the association from the detector to a remote reader.

In a further example of the sixth aspect and the above examples, the method further includes sending the initial signal from the detector in response to detecting a user event.

In a further example of the sixth aspect and the above examples, the method further includes when more than one tag is in the second zone and no tag is in the first zone, selecting the tag for association with the user event based on a movement characteristic.

In a particular example, portions of the methods can be implemented in software computer implemented instructions. Such computer implementable instructions can be stored on non-transitory media, including optical storage, electronic storage, or other storage media.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below.

Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system comprising:
   a detector including:
      a sensor to detect an event; and
      a communication circuitry to communicate at a first frequency band;
   a reader comprising communication circuitry to communicate at a second frequency band;
   a plurality of tags, each tag including:
      a first communication circuitry to communicate at the first frequency band; and
      a second communication circuitry to communicate at the second frequency band; and
   the detector to communicate with the plurality of tags via the communication circuitry of the detector, the detector to determine whether to associate a select tag of the plurality of tags with the event, the detector to communicate the determined association to the select tag at the first frequency band, the select tag to communicate the association to the reader using the second communication circuitry at the second frequency band, the select tag to communicate using the second communication circuitry of the select tag with the reader.

2. The system of claim 1, wherein the event is a user event.

3. The system of claim 1, wherein the event is an autonomous event.

4. The system of claim 1, wherein the select tag is to confirm receipt of the determined association to the detector using the first communication circuitry.

5. The system of claim 1, wherein the select tag includes a notification circuitry to notify a user in response to receiving the determined association.

6. The system of claim 1, wherein the detector includes a second communication circuitry to communicate at the second frequency band and wherein the detector is to communicate the determined association to the reader.

7. The system of claim 1, wherein the first frequency band is in the range of 750 MHz to 1 GHz.

8. The system of claim 1, wherein the second frequency band is in the range of 300 MHz to 500 MHz.

9. The system of claim 1, wherein the first and second frequency bands overlap.

10. The system of claim 1, further comprising a dispenser including a user interface communicatively coupled to the sensor of the detector, the detector to communicate with the plurality of tags in response to activation of the user interface.

11. The system of claim 1, further comprising a beacon device to transmit an infrared beacon signal including a location identifier.

12. The system of claim 11, wherein the each tag of the plurality of tags further includes an infrared receiver to receive the infrared beacon signal.

13. The system of claim 12, wherein the each tag of the plurality of tags is to communicate the location identifier of the received infrared beacon signal to the reader using the second communication circuitry.

14. The system of claim 1, wherein the communication circuitry of the detector and the first communication circuitry are short-range communication circuitries having a range of not greater than 10 feet, and wherein the second communication circuitry and the communication circuitry communicate at ranges longer than the short-range communication circuitries.

15. A detector comprising:
   a sensor to detect a user event;
   a first communication circuitry to communicate at a first frequency band, the first communication circuitry being directional;
   a second communication circuitry to communicate at a second frequency band; and
   the detector to communication with a plurality of tags using the first communication circuitry in response to the user event detected via the sensor, the detector to associate a select tag of the plurality of tags with the user event, the detector to communicate the determined association to the selected tag at the first frequency band, the selected tag to communicate the association to the reader using the second communication circuitry at the second frequency band, the detector to communicate the association using the first or second communication circuitry.

16. The detector of claim 15, wherein the detector is to communicate the association using the second communication circuitry to a reader.

17. The detector of claim 15, wherein the first communication circuitry is a short-range communication circuitry having a range of not greater than 10 feet.

18. The system of claim 1, wherein the event is a soap dispensing event.

19. The detector of claim 15, wherein the user event is a soap dispensing event.

20. The detector of claim 16, wherein the first communication circuitry is a short-range communication circuitry having a range of not greater than 10 feet, and wherein the second communication circuitry has a longer range that then short-range communication circuitry.

\* \* \* \* \*